United States Patent
Hoffman et al.

(10) Patent No.: US 7,374,204 B2
(45) Date of Patent: May 20, 2008

(54) INFLATOR SECOND STAGE COMBUSTION CONTROL

(75) Inventors: Isaac Hoffman, Kaysville, UT (US); Kirk Rassmussen, West Point, UT (US); Bradley Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 79 days.

(21) Appl. No.: 11/287,843

(22) Filed: Nov. 28, 2005

(65) Prior Publication Data

US 2007/0120349 A1 May 31, 2007

(51) Int. Cl.
*B60R 21/26* (2006.01)
*B60R 21/264* (2006.01)

(52) U.S. Cl. .................. 280/741; 280/736; 280/737

(58) Field of Classification Search ............. 280/736, 280/741, 742, 740, 737
See application file for complete search history.

(56) References Cited

U.S. PATENT DOCUMENTS

| | | | |
|---|---|---|---|
| 5,803,494 A * | 9/1998 | Headley | .............. 280/741 |
| 6,142,515 A | 11/2000 | Mika | |
| 6,315,322 B1 | 11/2001 | Mika | |
| 6,364,353 B2 | 4/2002 | Green, Jr. et al. | |
| 6,474,684 B1 * | 11/2002 | Ludwig et al. | .............. 280/741 |
| 6,543,805 B2 * | 4/2003 | McFarland et al. | ......... 280/736 |
| 6,701,849 B2 | 3/2004 | McFarland et al. | |
| 6,702,323 B2 * | 3/2004 | Goetz | .............. 280/736 |
| 7,044,502 B2 * | 5/2006 | Trevillyan et al. | .......... 280/741 |
| 7,104,569 B2 * | 9/2006 | Goetz | .............. 280/736 |
| 2005/0161924 A1 * | 7/2005 | Schoenhuber et al. | ...... 280/741 |

\* cited by examiner

*Primary Examiner*—Ruth Ilan
*Assistant Examiner*—Joseph Rocca
(74) *Attorney, Agent, or Firm*—Sally J Brown; Madson & Austin

(57) ABSTRACT

A new type of airbag inflator that may be used in an airbag system is disclosed. The inflator will generally include a housing and two initiators. Accordingly, the inflator is a "dual-stage" inflator. The two stages are disposed within the housing. The second initiator is disposed within a second stage generant cup. A cap is also used to engage the second stage cup. The cap maintains seated engagement with the second stage cup, even during deployment of the second stage. The second stage will also include one or more perforations, which constitute openings through which gas may flow. When the second initiator is in the unactuated state, these perforations will be isolated from the generant by the cap. Actuation of the second initiator unseals the one or more perforations but does not unseat the cap from the cup, due to constraints put in place to prevent such unseating.

20 Claims, 9 Drawing Sheets

INFLATOR SECOND STAGE COMBUSTION CONTROL

BACKGROUND OF THE INVENTION

1. Technical Field

The present invention relates to airbag inflators. More specifically, the present invention is a new type of airbag dual-stage inflator that may be used with vehicle airbag systems.

2. Description of the Prior Art

Vehicle airbag systems are known in the art and have been credited with greatly increasing the overall safety of motor vehicles. Specifically, these airbag systems are designed such that during an accident, one or more airbags will be rapidly inflated and will be positioned between the vehicle occupant and the hard surfaces of the vehicle interior. These inflated airbags will inhibit the vehicle occupant from impacting the interior surfaces of the vehicle and will thus greatly reduce the likelihood that the occupant will experience significant injuries in the crash.

As is known in the art, airbag systems will generally include an inflator that is capable of rapidly producing a large quantity of gas. As its name implies, the purpose of the inflator is to "inflate" the airbag. When an accident occurs, the inflator will rapidly produce a large quantity of gas that is then channeled into the airbag. In turn, such rapid influx of gas inflates and expands the airbag and causes the airbag to become positioned in front of one or more of the interior surfaces of the vehicle. As accidents occur quickly, this inflation of the airbag must occur very rapidly-i.e., generally within approximately 100 or 150 milliseconds.

Many currently known inflators are referred to as "dual-stage" inflators in that these devices contain two separate chambers that contain generant to be ignited separate from each other. Examples of these types of dual-stage inflators are disclosed in the followings patents (which patents are expressly incorporated herein by reference): U.S. Pat. No. 6,364,353; U.S. Pat. No. 6,142,515; U.S. Pat. No. 6,315,322; and U.S. Pat. No. 6,701,849. As explained in these patents, these dual-stage inflators are designed such that if the vehicle experiences a less-severe, less-dangerous crash, the initiator in the first chamber will be signaled and will be used to inflate the airbag. However, if a more serious crash is experienced such that the airbag needs to be inflated at a more rapid rate and/or to a greater peak pressure, then both the first chamber and the second chamber will be used to inflate the airbag.

Unfortunately, there are significant problems associated with currently known dual-stage inflators (such as the type disclosed in the above-referenced patents). Specific types of pyrotechnic dual-stage inflators are designed such that the second stage contains a supply of gas generant that is combusted to form a quantity of inflation gas. However, at the time that this combustion occurs in the second chamber, the internal pressure within the inflator has already been dissipated and brought back down to ambient (atmospheric) pressure (or near atmospheric pressure).

The combustion of the second initiator's gas generant at atmospheric pressure creates significant disadvantages. For example, such combustion at atmospheric pressure generally results in incomplete combustion/reaction of the gas generant. This incomplete combustion is undesirable in that it results in the formation of undesirable effluents or side-products. Vehicle manufacturers have determined that inflators producing such undesirable effluents may not be used in certain airbag applications. Likewise, in this situation, the late second chamber combustion will not produce gas rapidly enough to provide late event restraint of the occupant (which may be desirable in certain applications).

Accordingly, it would be an advancement in the art to produce a new type of dual-stage inflator that addresses these problems. More specifically, it would be an advancement to create a new dual-stage inflator that does not produce these undesirable effluents and may be used in all types of airbag applications. Such a device is disclosed herein.

BRIEF SUMMARY OF THE INVENTION

The present embodiments relate to an airbag system that may be used on a vehicle interior. Like other airbag systems, this present system includes an airbag to inflate in front of the vehicle occupant in the event an accident or crash occurs, thereby protecting the occupant and preventing the occupant from harmfully impacting a portion of the vehicle interior.

The airbag system will generally include an inflator that is capable of producing a large quantity of gas that will be used to inflate the airbag. The inflator contains two separate chambers or stages—namely a first stage and a second stage. A sensor will also be use with the airbag system. The sensor communicates with a controller and is designed to detect when the vehicle is experiencing a crash. Accordingly, in the event that the sensor detects a crash, the sensor signals the controller, which in turn, causes the inflator to inflate the airbag.

In addition to detecting the occurance of a crash, the sensor also detects the severity of the crash. If the sensor determines that the severity of the crash is above a first predetermined threshold level, the sensor will so indicate to the controller. Likewise, if the sensor determines that the severity of the crash is above a second predetermined threshold level—the second predetermined level being greater than the first—then the sensor will indicate to the controller that a more serious and significant crash is occurring.

The severity of the crash that is detected by the sensor will determine how the airbag is inflated. Specifically, if the severity of the crash is only above the first threshold level, then the controller will inflate the airbag using only the first stage. However, if the severity of the crash is determined to be above the second threshold level, the controller will inflate the airbag using both the first stage and the second stage.

In the event that only the first stage is actuated by the controller, the airbag will be inflated without the use of the second stage. In such a situation, the gas generant housed in the second stage will remain in the solid, undeployed state. Generally, this will be accomplished by having a first initiator ignite and/or convert gas generant stored in the inflator into a quantity of inflation gas. Such actuation of the first stage will also unseal the inflator such that the inflation gas created by the first stage may exit the inflator and enter the airbag.

In the event that both the first stage and the second stage are used to deploy the airbag, embodiments may be constructed in which the first stage actuates prior to actuation of the second stage. Other embodiments, however, may be constructed in which both the first stage and the second stage are actuated at the same time.

The second stage that is used as part of the present embodiments has a generant cup. This cup is generally used to house a quantity of gas generant. A cap is also used in conjunction with the cup and engages the cup in seated engagement. Taken together, the generant cup and the cap forms a chamber that is sealed. Accordingly, the gas generant within the generant cup is kept in a sealed environment.

Unlike many previously known systems, the cap associated with the second stage includes one or more perforations. These perforations are holes through which gas or air may pass. However, when the second stage is in the undeployed, unactuated state, the perforations will be sealed by the relative positions of the cup and the cap.

If the second stage receives the actuation signal from the controller, the second stage will ignite/combust the gas generant housed within the generant cup. Such ignition/combustion of the gas generant pushes outwardly on all surfaces on the cap. This force upon the cap will not fully unseat the cap from the generant cup due to controls in place for this purpose. However, such force will cause the cap to displace from its relative position with the generant cup. In turn, this displacement of the cap exposes the perforations in the cap to the second stage load and allows the inflation gas produced by the ignition of the gas generant to escape the cup. Once the inflation gas has left the cup, the inflation gas may be combined with the inflation gas produced by the first stage and may be used to inflate the airbag.

It should be noted however that even after the perforations become exposed to the second stage, the pressure maintained within the initiator cup is greater than atmospheric pressure due to the controlling influence of the perforations. Accordingly, when the gas generant within the cup combusts, this combustion occurs at high/optimal pressures rather than atmospheric/ambient pressure.

Other embodiments of the present invention may also be constructed such that the perforations associated with the second-stage are located on the generant cup rather than the cap. Accordingly, when the gas generant is combusted within the second-stage, the produced inflation gas will push against the generant cup and cap to expose the perforations. In turn, displacement of the cup and cap from their relative pre-combustion positions unseals the perforations and allows the inflation gas to escape out from the interior of the cup.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
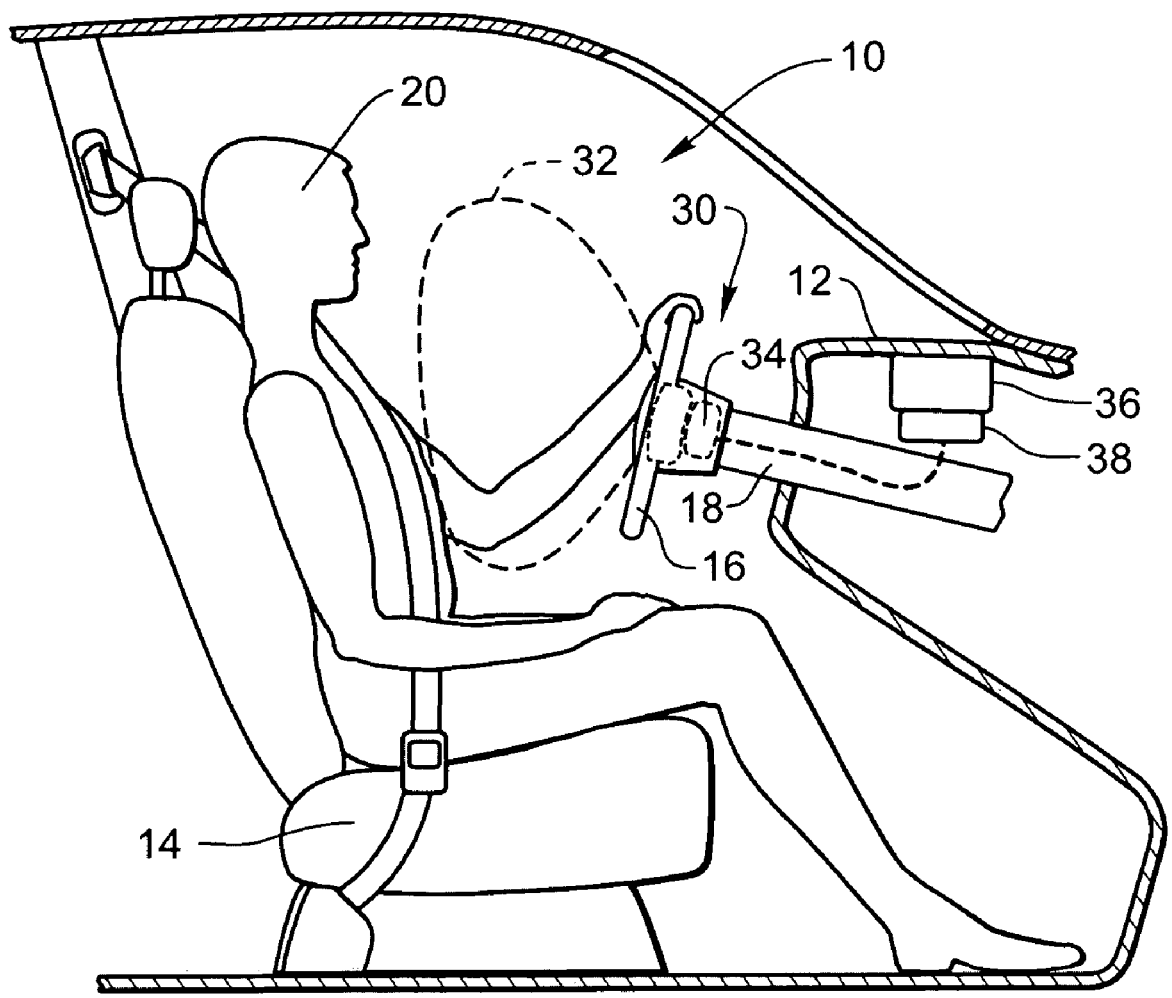
FIG. 1 is a cutaway sectional view of a vehicle interior which includes an airbag system according to the present embodiments.

Referring now to FIG. 1, a cutaway sectional view of an example of a vehicle interior 10 is illustrated. The vehicle interior 10 includes a dashboard 12, an occupant seat 14, a steering wheel 16, and a steering column 18. The steering column 18 operates to support the steering wheel 16 and connect the steering wheel 16 to the dashboard 12. A vehicle occupant 20 is also shown on the vehicle interior 10. The vehicle occupant 20 is seated on the occupant seat 14.

As is known in the art, an airbag system 30 is included within the vehicle interior 10. The airbag system 30 includes an inflatable restraint 32 (shown in phantom) that is designed to inflate in the event of an accident or crash. More specifically, as shown in FIG. 1, the inflatable restraint 32 is an airbag designed such that if a crash occurs, the inflatable restraint (or airbag) 32 will inflate in front of the occupant 20 and inhibit the occupant 20 from harmfully impacting the steering wheel 16, the steering column 18, the dashboard 12, or other portions of the vehicle interior 10.

It should be noted that the airbag system 30 shown in FIG. 1 is a "steering wheel" airbag system in that the airbag 32 is designed such that it will inflate from the steering wheel 16 and will protect the vehicle driver in the event of a crash.

However, this illustration is made for illustrative purposes only. Those of skill in the art will recognize that embodiments of the airbag system 30 could also be implemented as part other types of vehicular airbag systems. For example, the airbag system 30 could also be implemented (either in whole or in part) as a passenger airbag system, an overhead airbag system, a knee airbag system, knee-bolsters, a side-curtain airbag system, a glove-box airbag system, a dashboard airbag system, inflatable seat belts, etc.

The airbag system 30 shown in FIG. 1 also includes an inflator 34. This inflator will be described in greater detail below. The inflator 34 is a device that is capable of producing a large quantity of gas that will be used to inflate the airbag 32.

A sensor 36 may also be added to the airbag system 30. This sensor 36 is a device that is known in the art and is designed to sense/detect when the vehicle is experiencing a crash. Usually, the sensor 36 detects this crash by sensing impact, measuring the deceleration of the vehicle, or sensing any of a variety of known physical parameters. The sensor 36 may be attached to a controller 38, which is a microcomputer or other type of processing device. This controller 38 is designed such that if the sensor 36 detects a crash, the controller 38 will process a signal received from the sensor 36 and will cause the inflator 34 to produce the quantity of inflation gas necessary to inflate the airbag 32.

Figure 2:
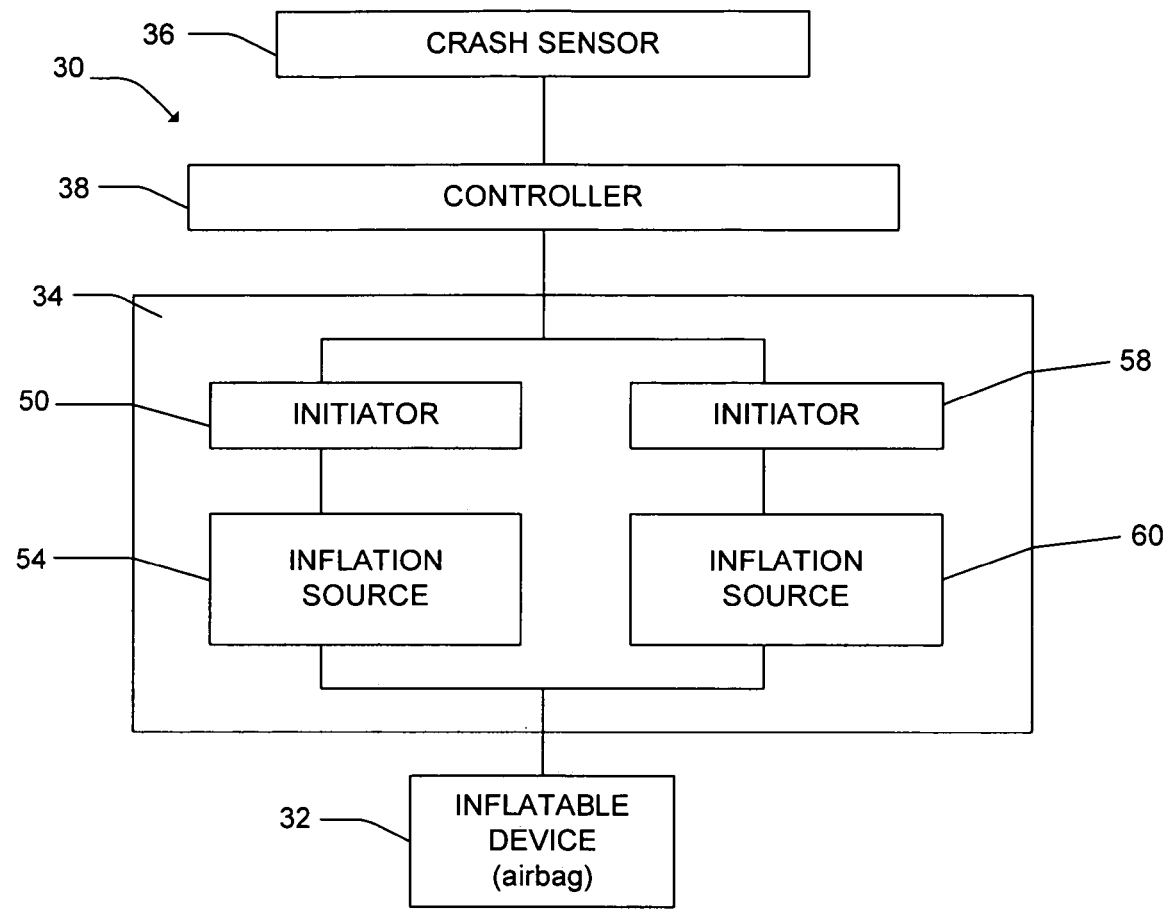
FIG. 2 is a schematic view of the airbag system of FIG. 1.

Referring now to FIG. 2, a schematic view illustrates the general operation of the airbag system 30. If the sensor 36 detects that a crash is occurring, the sensor 36 will determine the severity of the crash or impact. If the severity of the impact is determined to be at or above a first predetermined threshold level, the sensor 36 indicates this situation to the controller 38. The first threshold level of crash severity is a level at which inflation of the airbag 32 at a relatively low rate is desired for protection of a vehicle occupant 20 (shown in FIG. 1). If the vehicle condition sensed by the crash sensor 36 is at or above a second predetermined threshold level, it indicates the occurrence of an impact having a second, higher, predetermined threshold level of severity. The second threshold level of impact severity is a level at which inflation of the airbag 32 at a relatively high rate is desired for protection of a vehicle occupant 20.

As shown in FIG. 2, the inflator 34 includes a first initiator 50. The first initiator 50 is designed such that it is capable of initiating production of a quantity of inflation gas from a first inflation source 54. Generally, this first inflation source 54 is a gas generant material that will produce a quantity of gas if ignited. Accordingly, the first initiator 50 operates to produce the quantity of inflation gas by igniting the gas generant.

The inflator 34 is designed such that if the sensor 36 senses that the impact is above the first threshold level, the controller 38 will send a signal to the inflator 34 that causes the first initiator 50 to ignite the first inflation source 54 and produce the inflation gas. This inflation gas will then be channeled into the airbag 32 to inflate the airbag 32.

The inflator 34 shown in FIG. 2 also includes a second initiator 58 that is capable of initiating production of a quantity of inflation gas from a second inflation source 60. Again, this second inflation source 60 is a gas generant material that will be ignited by the second initiator 58 to produce a quantity of gas if ignited. In some embodiments, the first and second inflation sources 54, 60 will comprise the same material. Of course, other embodiments may be constructed in which the material used for the first inflation source 54 differs from the material used for the second inflation source 60.

In the event that the sensor 38 determines that the severity of the impact is above the second threshold level which is greater than the first threshold level, the sensor 38 will send an appropriate signal indicating this condition to the controller 38. Upon receipt of this signal, the controller 38 will send a signal to the inflator 34 that causes both the first initiator 50 and the second initiator 58 to ignite the respective inflation sources 54, 60. This ignition of both the first and the second inflation sources 54, 60 produces greater quantities of inflation gas that will inflate the airbag 32 at a relatively higher rate in order to provide the occupant 20 with greater protection during this impact.

Figure 3:
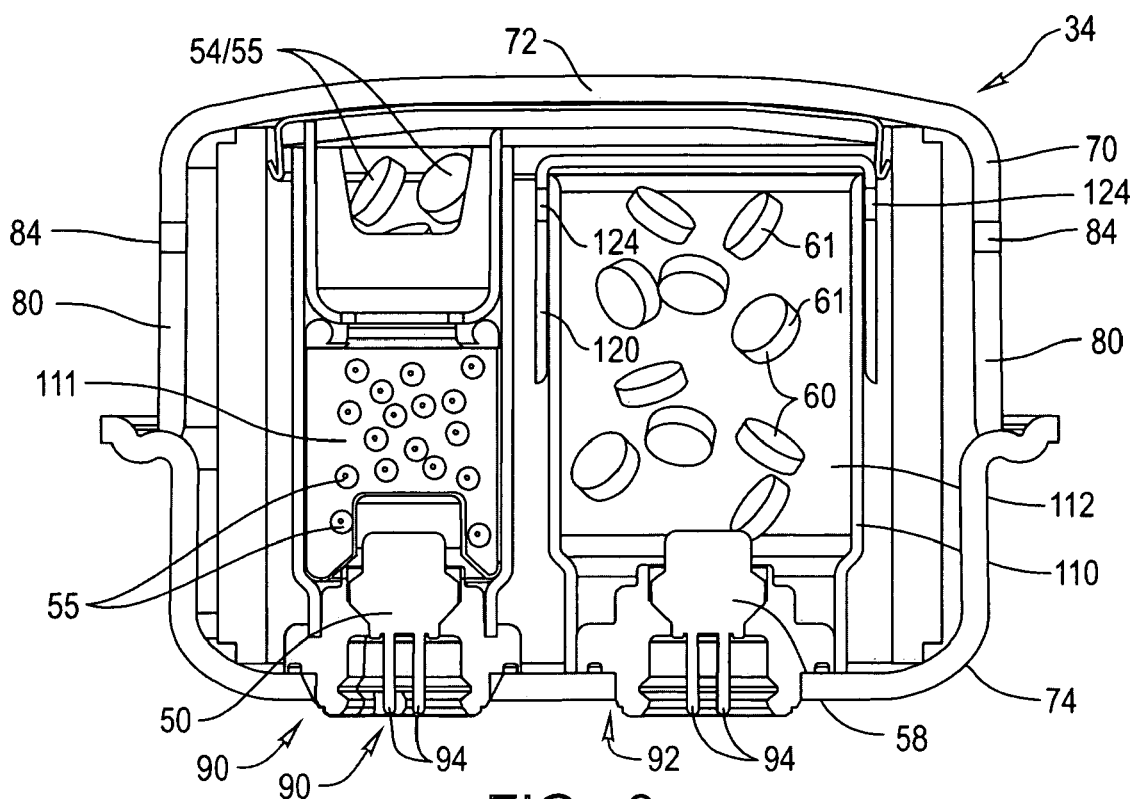
FIG. 3 is sectional view of an inflator according to the present embodiments, wherein the inflator is shown in the unactuated position.

Referring now to FIG. 3, a sectional view illustrates an embodiment of the inflator 34 in greater detail. As will be described herein in greater detail, the inflator 34 is a dual-stage inflator that comprises two separate chambers or stages that may be deployed separately (or simultaneously) to inflate an airbag. For background information on other types of known dual-stage inflations, the reader may consult the following patents: U.S. Pat. No. 6,364,353; U.S. Pat. No. 6,142,515; U.S. Pat. No. 6,315,322; and U.S. Pat. No. 6,701,849 (which patents are incorporated herein by reference).

The inflator 34 may comprise a housing 70. This housing 70 is generally cylindrical in shape and is made of metal (such as aluminum or stainless steel) or another suitable material. This housing will generally comprise an upper wall 72 (which is sometimes referred to as a "diffuser"). The housing also includes a lower wall 74 (which is sometimes called a "base"). The upper wall 72 may be "domed," that is, the wall 72 has a curved configuration that projects away from the lower wall 74. Likewise, the lower wall 74 may also be "domed"—i.e., configured with a curved configuration that projects away from the upper wall 72.

The upper wall 72 and the lower wall 74 are connected by side walls 80. One or more inflation outlets 84 are disposed in a circular array on the side walls 80. Each one of the inflation fluid outlets 84 extends radially through the side wall 80. As will be explained in greater detail below, the outlets 84 enable flow of inflation fluid out of the inflator 34 to inflate the airbag 32. One or more filters (not shown) through which air may pass can also be positioned in front of the outlets 84. These filters are designed to filter the inflation gas that exits the inflator 34. Other features known in the art, such as heat sinks (not shown) that are designed to cool the inflation gas as it exits the inflator 34, may also be included as part of the inflator 34.

The housing 70 comprises two openings 90, 92 that are disposed along the lower wall 74. These openings 90, 92 provide a space through which electrical terminals 94 on the first initiator 50 and the second initiator 58 may be attached to electrical wires (not shown). As is known in the art, these terminals 94 are connected, via the electrical wires, which are capable of supplying an electrical current into the initiators 50, 58. More specifically, when the controller 38 sends the signal to the inflator 34 to deploy, electrical current will be sent to one or more of the initiators 50, 58, thereby causing the initiators 50, 58 to ignite the inflation sources 54, 60.

The first inflation source 54 is positioned proximate the first initiator 50. The first initiator 50 is positioned within a first chamber 111. (As explained in greater detail herein, this first chamber 111 comprises the first stage of the inflator 34). In the embodiment shown in FIG. 3, the first inflation source 54 is a solid gas generant 55. As will be explained in greater detail below, the inflator 34 is designed such that the first inflation source 54 constitutes the "first stage" of the dual stage inflator 34. In other words, during an accident or crash, the first inflation source 54 will be ignited/combusted to produce a first stage of inflation gas that may be used to inflate the airbag 32.

As shown in FIG. 3, a generant cup 110 (which may also be referred to as the "second generant cup" or "second stage cup") is used in conjunction with the second initiator 58. This generant cup 110 comprises one or more walls that are designed to create a second chamber 112 that houses the second inflation source 60. (The second chamber 112 is sometimes referred to as the "second stage" or "second generant chamber"). In some embodiments, the second chamber 112 will also house all or a portion of the second initiator 58. As is known in the art, the second inflation source 60 may comprise solid gas generant 61. In many embodiments, the second gas generant 61 and the first gas generant 55 will be composed of the same material. Of course, other embodiments may have the second gas generant 61 be composed of a different material than that which is used to make up the first gas generant 55.

A cap 120 is also used in conjunction with the second initiator chamber 112. This cap 120 is described in greater detail herein. As can be seen in FIG. 3, the cap 120 engages the second generant cup 110 in seated engagement with the second generant cup 110. The cap 120 operates to seal and enclose the second chamber 112. Generally, the cap 120 will be press fit onto the cup 110 to ensure that the chamber 112 is sealed.

In the embodiment shown in FIG. 3, the cap 120 includes one or more perforations 124. The size and number of the perforations 124 will depend upon the particular embodiment. These perforations 124 are holes or openings that have been formed into the cap 120. However, as shown in FIG. 3, the cap 120 is designed such that when the second initiator 58 is in the non-actuated state, the perforations 124 are isolated from the second stage (i.e., closed) by the relative position of cap 120 to the cup 110. Accordingly, even with the perforations 124, the second chamber 112 is a sealed chamber.

Figure 4:
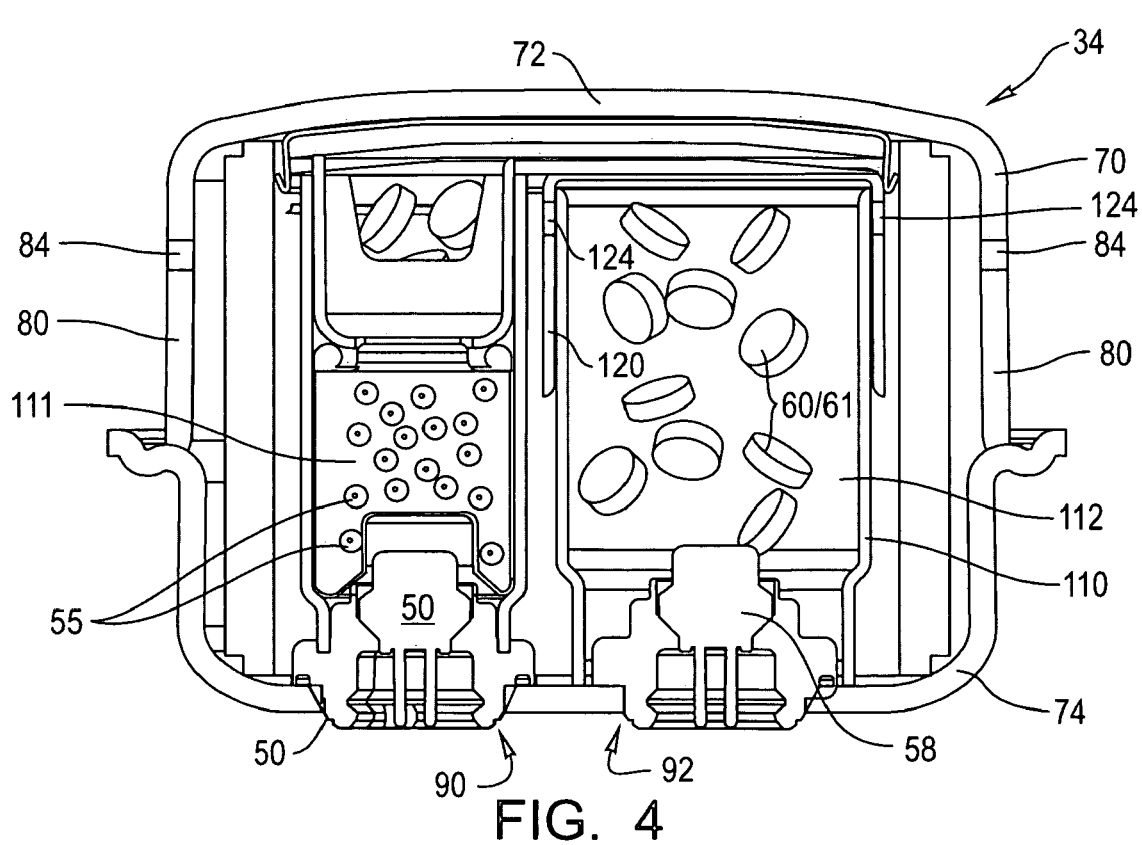
FIG. 4 is a sectional view of the inflator of FIG. 3 in which only the inflator's first initiator has been actuated.

Referring now to FIG. 4, a sectional view illustrates the inflator 34 during actuation of the first stage. Specifically, in FIG. 4, the controller 38 (not shown) has received a signal from the sensor 36 that the vehicle is experiencing a crash in which the severity of the impact is above the first threshold level. Accordingly, the controller 38 has sent the appropriate signal to the inflator 34 causing actuation of the first initiator 50.

Upon receipt of the appropriate signal from the sensor 36, the controller 38 causes an electrical current to be sent to the terminals 94 that are located on the first initiator 50. (However, in this situation, no electrical current is sent to the second initiator 58.) This influx of current into the first initiator 50 deploys the first stage of the inflator 34 by igniting/combusting the first inflation source 54/gas generant 55. Such ignition/combustion of the first inflation source 54/gas generant 55 creates a quantity of inflation gas at a pressure of 1,000 to 4,000 psi (or more). Once the first inflation source 54/gas generant 55 has been converted into a quantity of inflation gas, this gas may then be channeled out of the inflator 34 (via the outlets 84) into the airbag 32.

It should be noted that prior to ignition/combustion of the first inflation source 54, the first stage of the inflator 34 is maintained in a sealed condition so that the inflation source 54 can combust at a high pressure (and so that none of the inflation source 54 will leak out of the inflator 34). Accordingly, when the first inflation source 54 is deployed, such deployment will also have the effect of unsealing the first stage such that gas may flow out of the inflator 34. Such "unsealing" of the inflator 34 may be accomplished in a variety of ways, as is known in the art, including blowing a seal, moving/deforming the upper wall 72 so that a fluid path is exposed, removing a lid/barrier that seals the inflator, etc. Of course, other means for unsealing the inflator 34 may also be used.

It should be noted however, that the actuation of the first initiator 50 does not affect the second initiator 58. Rather, the second initiator 58 and the second inflation source 60 remain sealed by the cap 120 and remains unreacted—i.e., in the solid state.

Figure 5:
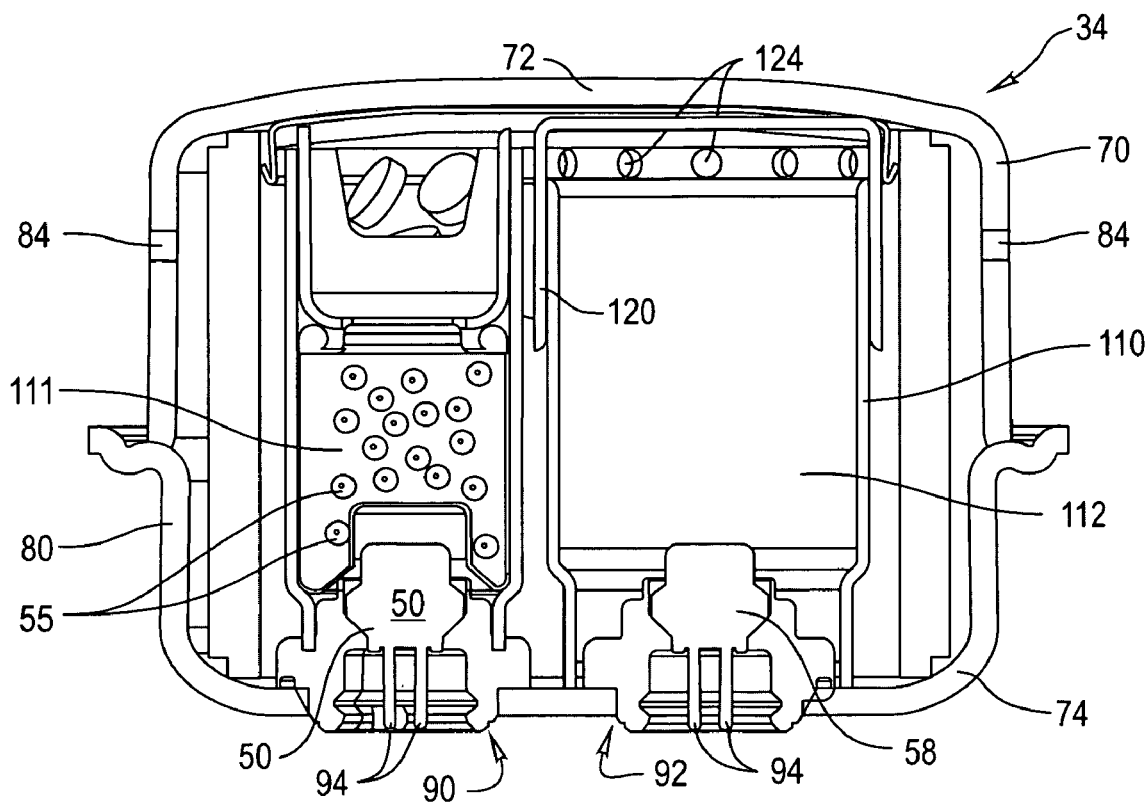
FIG. 5 is a sectional view of the inflator of FIG. 3 in which both the first initiator and the second initiator have been actuated.

Referring now to FIG. 5, a sectional view illustrates the inflator 34 during actuation of the inflator 34 in the event that the sensor 36 has detected a crash in which the severity of the impact is greater than the second predetermined level. As noted above, the second threshold level is greater than the first threshold level. Accordingly, when the sensor 36 signals to the controller 38 that the severity of the impact is at or above the second threshold level, the controller 38 knows that this impact is more serious (and potentially more dangerous) than an impact which severity is only at the lower, first threshold level.

Upon receipt of the signal from the sensor 36, the controller 38 will send the appropriate signal to the first initiator 50 and will cause the first initiator 50 to actuate in the manner discussed above in FIG. 4. (For purposes of brevity, this discussion will not be repeated). However, unlike the situation in FIG. 4, the controller 38 will also cause the second initiator 58 to actuate. In some embodiments, this actuation of the second initiator 58 will occur at the same time as the actuation of the first initiator 50. In other embodiments, the second initiator 58 will be actuated after actuation of the first initiator 58. Other embodiments may be constructed in which the second initiator 58 will begin actuation while the first initiator 50 is undergoing actuation-i.e., the first initiator 50 will begin the actuation process and then a short time later (5 milliseconds, 10 milliseconds, 20 milliseconds, 100 milliseconds etc.) the second initiator 58 will begin its actuation process.

In order to begin the actuation process, an electrical current will be introduced into the second initiator 58 via the electrical terminals 94. This influx of current into the second initiator 58 ignites the second inflation source 60/gas generant 61 that is housed within the second chamber 112. As is known in the art, this ignition of the second inflation source 60/gas generant 61 creates a quantity of inflation gas.

Once formed, the inflation gas housed on the interior of the second initiator chamber 112 pushes outwardly against the walls of the chamber 112. Unlike many previously known inflator systems, the production of the inflation gas from the second inflation source 60 does not cause the cap 120 to separate from the second cup 110. Rather, at all times during combustion/actuation of the second initiator 58, the cap 120 remains in seated engagement with the second initiator cup 110 due to constraints that are designed for this purpose (which will be described herein). However, the produced inflation gas does exert an outward force upon the cap 120 which causes the cap 120 to displace outwardly. In turn, this outward displacement of the cap 120 unseals and/or exposes the one or more perforations 124. Such unsealing of the perforations 124 means that the inflation gas on the interior of the second initiator chamber 112 may escape from the second initiator chamber 112 by passing through the perforations 124. Once this quantity of gas has passed through the perforations 124, this gas mixes with other inflation gas formed from the first inflation source 54/gas generant 55b and then flows out of the inflator 34 via the outlets 84 (in the manner described above).

As can be seen in FIG. 5, the deployment of the second initiator 58 will cause the cap 120 to displace and expose the perforations 124. In the embodiment shown in FIG. 5, the cap 120 will move outwardly until it abuts/contacts the upper wall 72, at which point, the upper wall 72 will restrict/prevent further movement of the cap 120. In this manner, the upper wall 72 prevents the cap 120 from being completely unseated from the cup 110. Of course, other embodiments may use other mechanisms for ensuring that the cap 120 does not unseat from the cup 110 including slots, hooks, engagement means, interlocking features, and/or any other feature capable of restricting the cap 120 from unseating from the cup 110.

It should be noted however, that the use of this cap 120 and perforations 124 provides significant advantages that are not available with previously known inflator systems. Specifically, as described above, one of the problems associated with known dual-initiator inflators is that combustion of the gas generant in the second stage usually occurs at atmospheric (ambient) pressure when fired at a delayed condition, which ultimately results in incomplete combustion of the gas generant, undesirable effluents, etc. The inflator 34 of the present embodiments does not suffer from these problems. Rather, in the inflator 34, combustion of the second inflation source 60 occurs within a closed, pressurized chamber 112 which is maintained at pressures that are greater than (or even much greater than) atmospheric pressure due to the controlling influence of the perforations 124 (and that the cap 120 does not unseat from the cup 110). Accordingly, when the second inflation source 60 is combusted, it will be completely burned at a high pressure and will not have high levels of undesirable effluents.

Figure 6A:
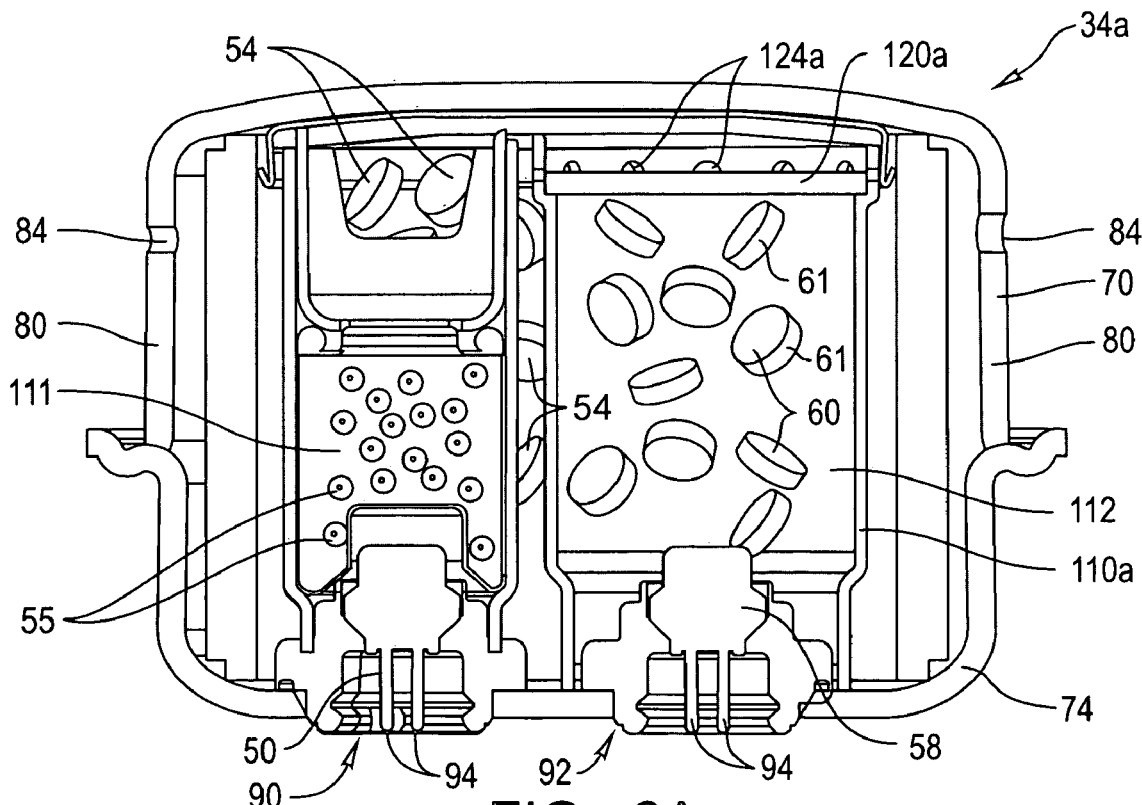
FIG. 6A is a sectional view of a second embodiment of an inflator that may be used in conjunction with the present airbag system showing both stages in the unactuated position.

Referring now to FIG. 6A, a second embodiment of an inflator 34a according to the present invention is illustrated. The inflator 34a is similar to the inflator 34 that was described above in conjunction with FIGS. 1-5. (For purposes of brevity, the above-recited description will not be repeated.) Rather, only the differences between this embodiment and the inflator 34 will be highlighted.

As can be seen in FIG. 6A, the first initiator 50 is used in conjunction with a first chamber 111 and the first inflation source 54 is housed outside of the first chamber 111. However, in other respects, the first initiator 50 will actuate and deploy the first stage of the inflator 34a in the manner outlined above. Of course, those of skill in the art will recognize how to implement and create an inflator 34a having a first chamber 111 that is used in conjunction with the first initiator 50.

The main difference between the inflator 34a shown in FIG. 6A and the inflator 34 discussed above relates to the second initiator 58 and will be discussed in greater detail below.

Unlike the inflator 34, the inflator 34a does not comprise a system in which the second generant cup 110 has a cap 120 that contains one or more perforations 124. Rather, in the inflator 34a, the perforations 124a are actually added to the second stage generant cup 110a. However, as shown in FIG. 6A, the perforations 124a are indeed sealed by the cap 120a in that the cap 120a holds the generant cup 110a in the proper position such that the perforations 124a remain covered/sealed.

Figure 6B:
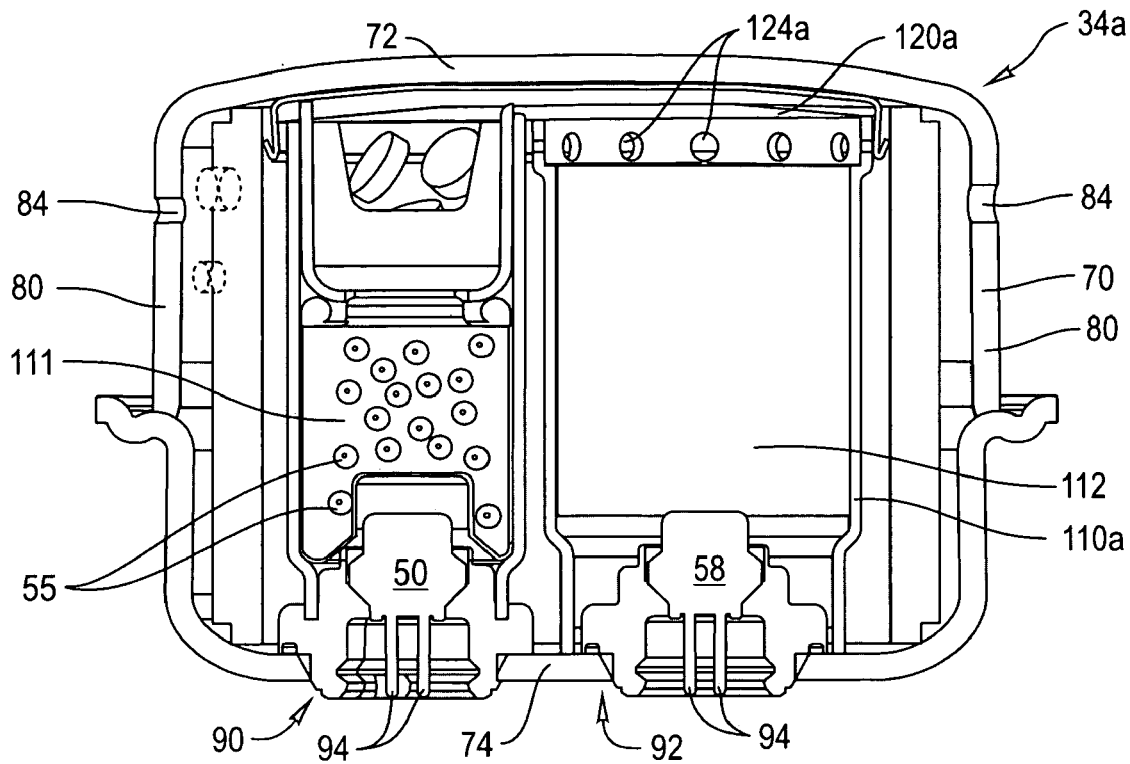
FIG. 6B is a sectional view of the inflator of FIG. 6A in which the both the first stage and the second stage have been actuated.

Referring now to FIG. 6B, a sectional view illustrates the inflator 34a as the second initiator 58 is being actuated. As shown in FIG. 6B, the combustion of the second inflation source 60 produces a quantity of inflation gas that exerts an outward force on the cap 120a and the second cup 110a. In turn, this exertion of force on the cap 120a that exposes the perforations 124a and allows inflation gas to exit out of the chamber 112. In some embodiments, this may be accomplished by having the cap 120a move outward such that the perforations 124a become exposed. Again, it should be noted however, that such movement of the cap 120a will not unseat the cap 120a from the cup 110a. Rather, the cap 120a will displace until it contacts the upper wall 72 of the inflator 34a, at which point, the upper wall 72 will restrict further movement of the cap 120a. Of course, other controlling features that will prevent the cap 120a from unseating from the cup 110a during movement may also be used.

Figure 7A:
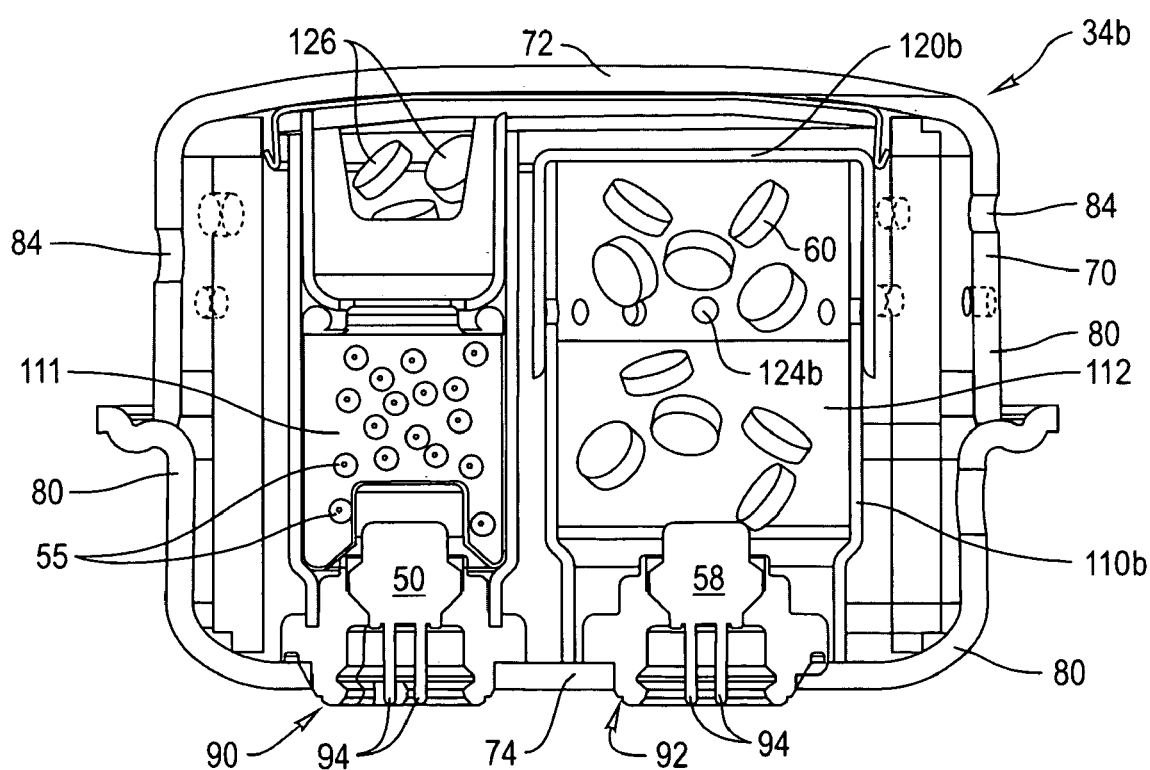
FIG. 7A is a sectional view of another embodiment of an inflator in which both stages are shown in the unactuated position.

Referring now to FIG. 7A, an additional embodiment of the present invention is illustrated. FIG. 7A shows an inflator 34b that is similar to the inflators 34, 34a discussed above. As shown in FIG. 7A, the inflator 34b comprises a first chamber 111 that is used in conjunction with the first initiator 50. This first chamber 111 will house a quantity of gas generant 55. Another supply of gas generant 126 is also positioned outside of the first chamber 111. Depending upon the embodiment, the gas generant 55 and the gas generant 126 may comprise the same material or may comprise different materials. Taken together, the gas generant 55 and the gas generant 126 constitute the first inflation source 54. Accordingly, the first initiator 50 will operate to deploy the first stage of the inflator 34b by igniting/combusting the first inflation source 54 (i.e., the gas generants 55 and 126) in the manner described above.

As with the previous embodiment, the main difference between the inflator 34b and the previously described inflators relates to the cap 120b and the generant cup 110b that is used to house the second inflation source 60. Specifically, this embodiment shows another type of cap 120b and cup 110b that may be used. The generant cup 110b is sealed by the cap 120b. Perforations 124b are also provided. These perforations are positioned on the cup 110b rather than on the cap 120b.

Figure 7B:
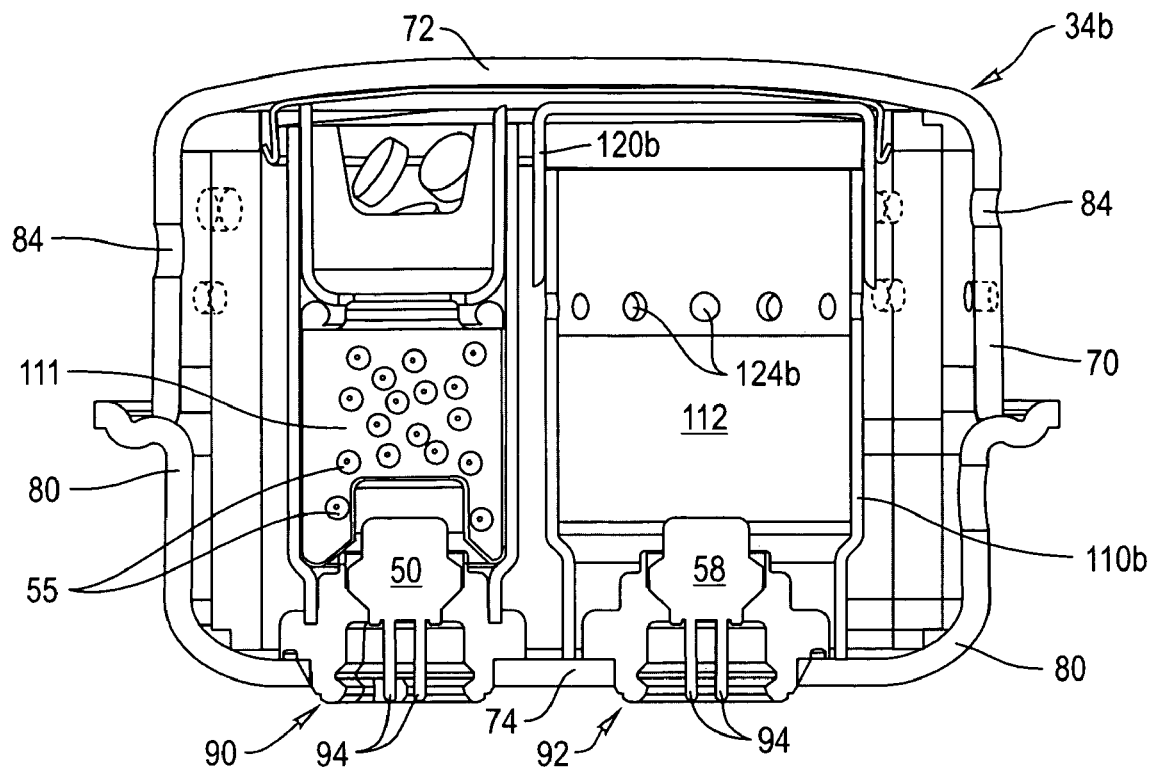
FIG. 7B is a sectional view of the inflator of FIG. 7A in which both stages have been actuated.

Referring now to FIG. 7B, a sectional view illustrates the inflator 34b as the second initiator 58 is being actuated. As with the previous embodiments, the actuation of the second initiator 58 will combust the second inflation source 60 (FIG. 7A) and will displace the cap 120b. This displacement of the cap 120b will expose and/or unseal the perforations 124b in the cup 110b such that the gas produced by the second inflation source 60 may be used to inflate the airbag 32. As with the previous embodiments, controls are put into place to ensure that the movement of the cap 120b will not operate to unseat the cap 120b from the cup 110b. Rather, the cap 120b will move until it abuts and/or contacts the upper wall 72 of the inflator 34b, and at that point, further movement of the cap 120b will be restricted so that the second stage may be deployed at a high/optimal pressure (as described above).

Figure 8A:
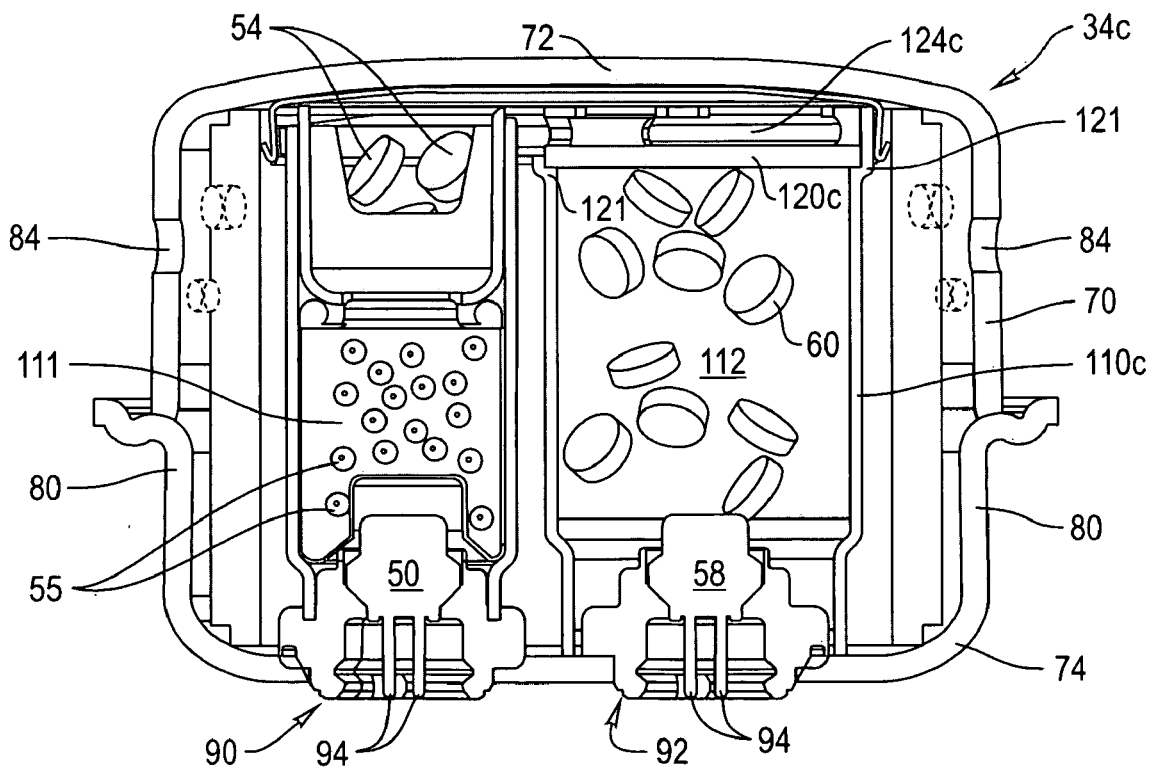
FIG. 8A is a sectional view of an additional embodiment of an inflator in which both stages are shown in the unactuated position.
Figure 8B:
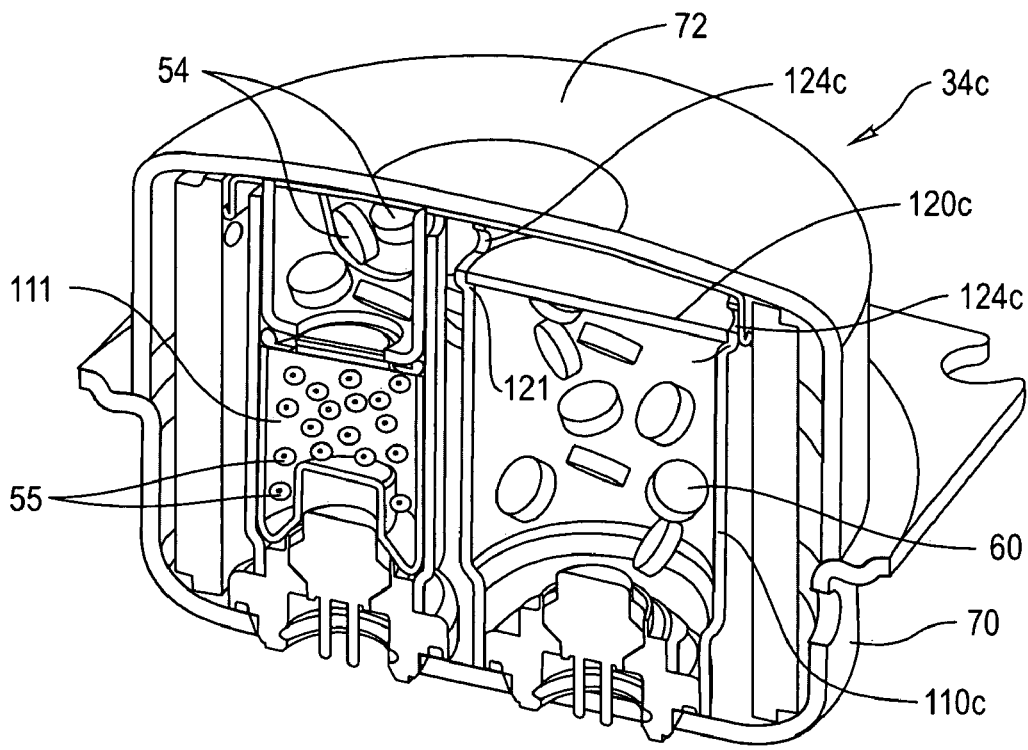
FIG. 8B is a perspective sectional view of the inflator of FIG. 8A.

Referring now to FIGS. 8A and 8B, an additional embodiment of an inflator according to the present invention is illustrated. FIGS. 8A and 8B are sectional views that illustrates an inflator 34c that is similar to the embodiments described previously. Specifically, the features and elements associated with the first stage and the first initiator 50 that are shown in FIG. 8A is similar and/or identical to that which was described above. However, with respect to the second stage, the embodiment shown in FIG. 8A includes a different type of generant cup 110c that is sealed by a cap 120c.

The generant cup 110c has a lip 121 that is designed such that it will receive and hold the cap 120c. In this embodiment, the cap 120c comprises a plug or barrier that will fit on the inside of the cup 110c. The lip 121 will hold the cap 120c in place and will prevent the cap 120c from moving inwardly toward the second initiator 58. As shown in both FIGS. 8A and 8B, one or more perforations 124c are positioned on the cup 120c. In the present embodiment, the perforation 124c is a slot or other opening. Generally, the perforation 124c is positioned above the lip 121. Accordingly, when the cap 120c is positioned against the lip 121, the cap 120c will seal the perforation 124c.

Figure 8C:
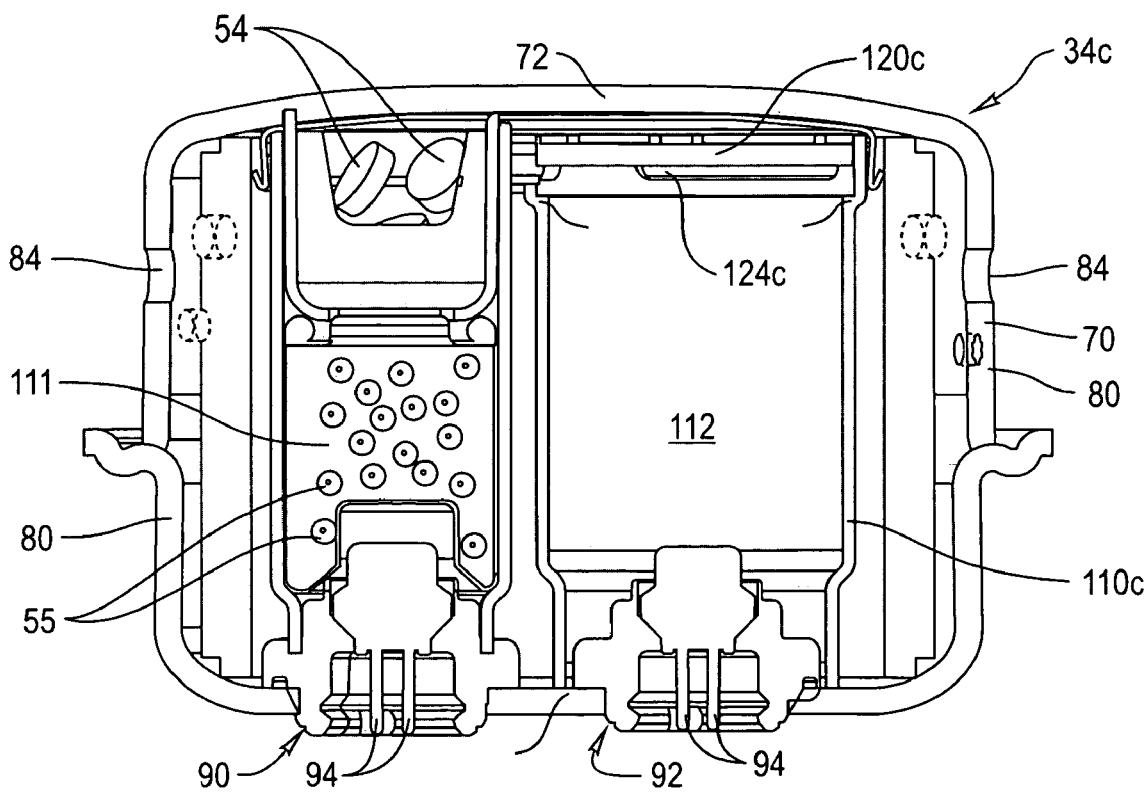
FIG. 8C is a sectional view of the inflator of FIG. 8A in which in which both stages have been actuated.
Figure 8D:
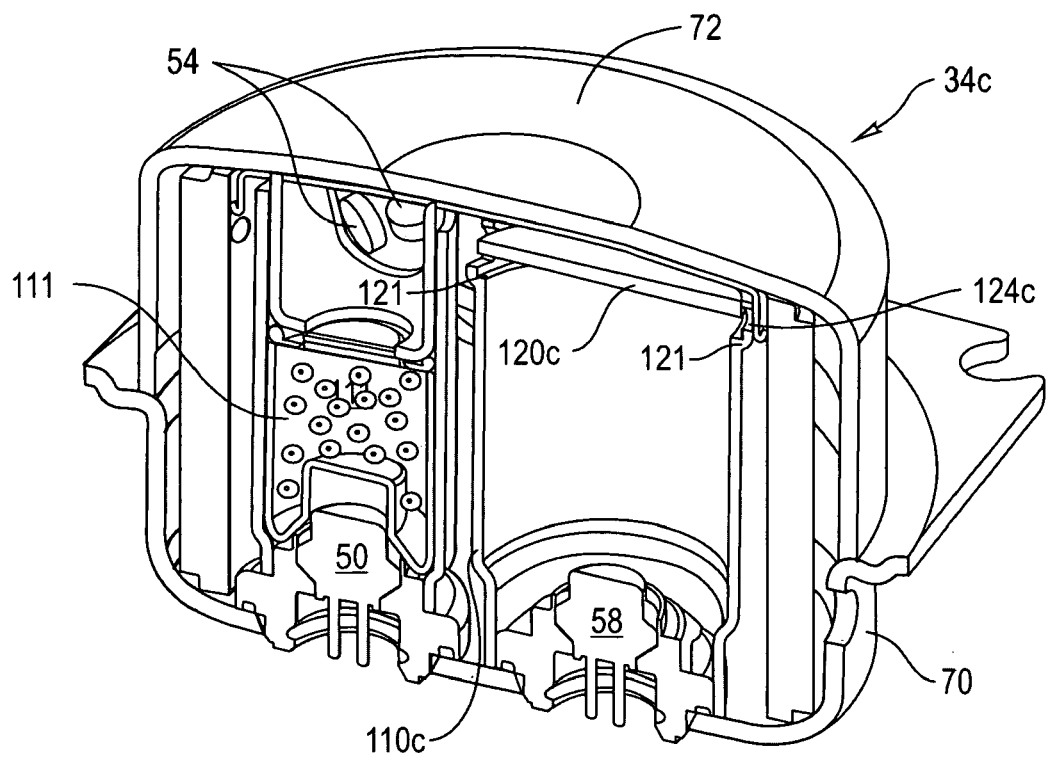
FIG. 8D is a perspective sectional view of the inflator of FIG. 8C.

Referring now to FIGS. 8C and 8D, the inflator 34c is shown as the second initiator 58 is actuated. As with the previous embodiments, actuation of the second stage of the inflator 34c will cause combustion/ignition of the second inflation source 60. In turn, this ignition of the inflation source 60 will cause the cap 120c to displace. In the embodiment shown in FIGS. 8C and 8D, the cap 120c will displace outwardly such that the cap 120c moves past the perforation 124c. In turn, such movement of the cap 120c unseals/exposes the perforation 124c and allows inflation gas to flow out of the second chamber 112.

As with the previous embodiments however, such displacement of the cap 120c does not cause the cap 120c to unseat from the cup 110c. Rather, the cap 120c will displace and move outwardly until it contacts the upper wall 72. Once such contact with the upper wall 72 is made, the abutment between the upper wall 72 and the cap 120c will prevent further movement of the cap 120c and will allow the second chamber 112 to remain pressurized for optimal combustion/ignition of the second inflation source 60 (as described above).

Figure 9A:
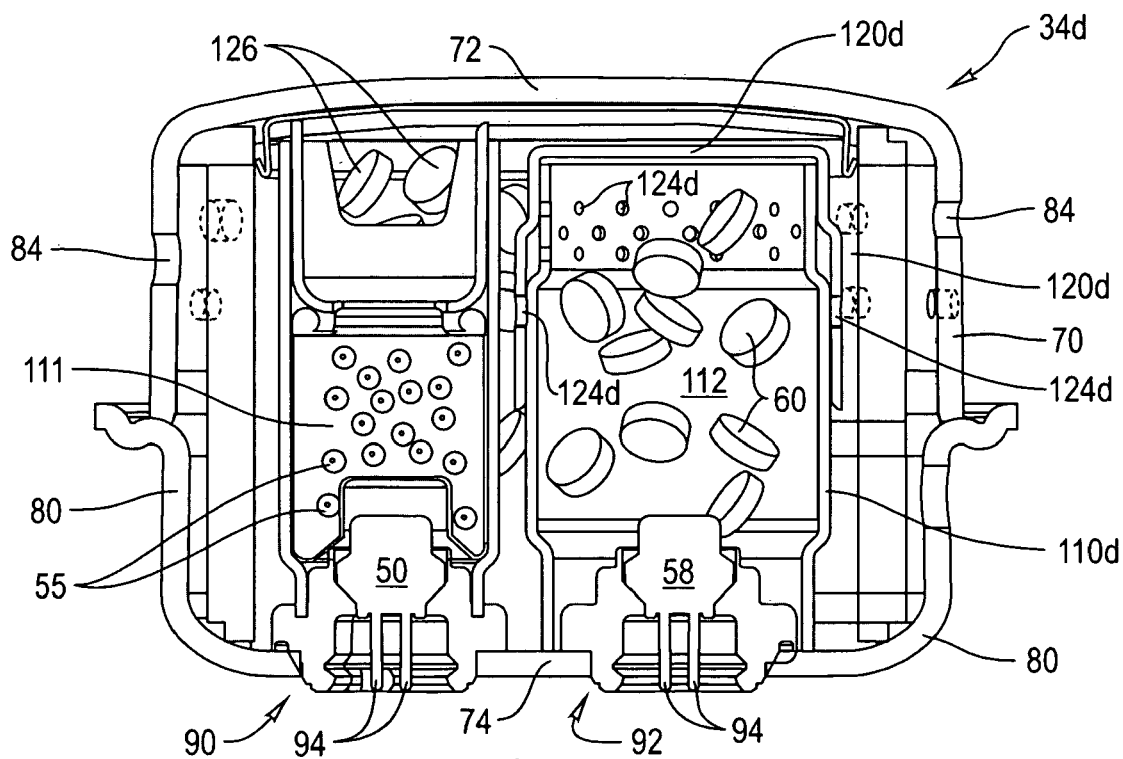
FIG. 9A is a sectional view of another embodiment of an inflator in which both stages are shown in the unactuated position.

Referring now to FIG. 9A, a further embodiment of an inflator 34d of the present invention is illustrated. The inflator 34d has a first chamber 111 and a first stage that is similar to that which is shown above in inflator 34b. However, the cap 120d and the generant cup 110d found in the second stage of the inflator 34d differ from that which is shown above.

Like some of the embodiments shown above, the cap 120d is designed such that it will be positioned over the top of the cup 110d. One or more perforations 124d are positioned on the cup 110d and on the cap 120d. However, because of the position of the relative positions of both the cup 110a and the cap 120d, the perforations 124d are sealed by the cap 120d when the inflator 34d is in the undeployed, unactuated position.

Figure 9B:
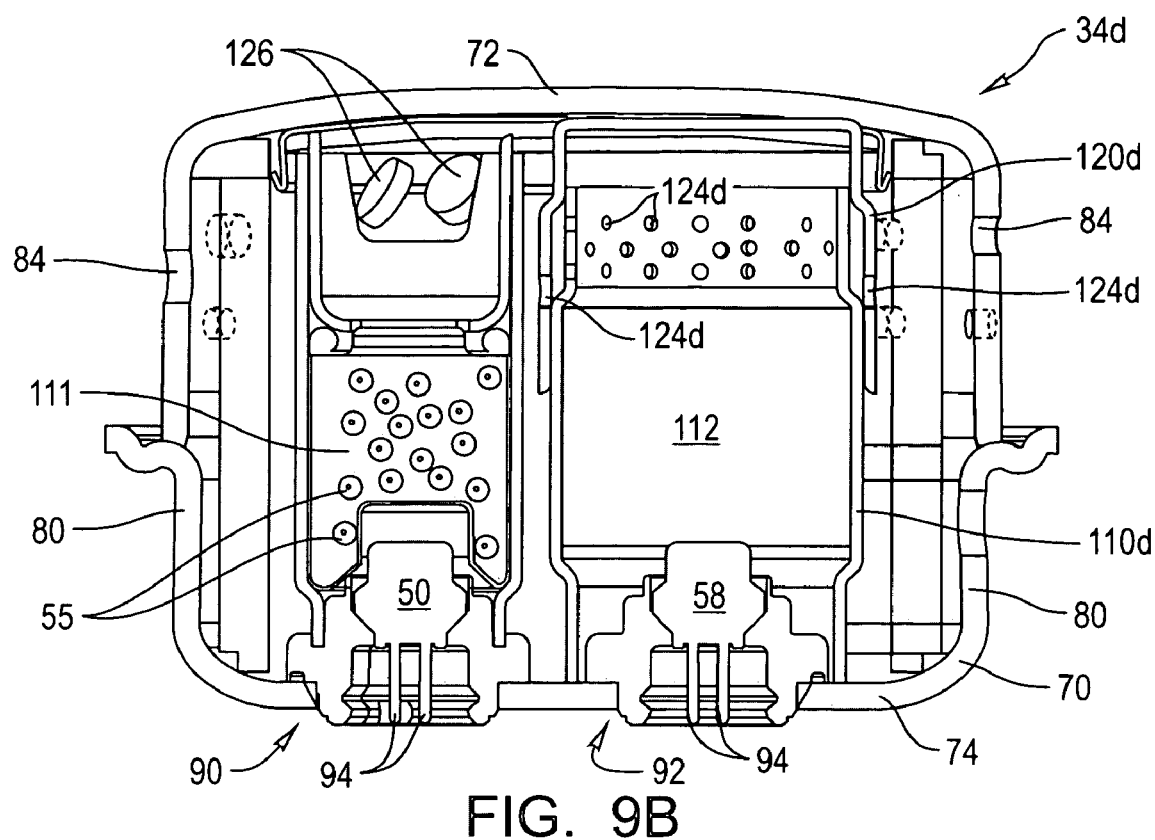
FIG. 9B is a sectional view of the inflator of FIG. 9A in which both stages have been actuated.

Referring now to FIG. 9B, the inflator 34d is shown as the second initiator 58 is actuated. As with the previous embodiments, actuation of the second initiator 58 causes outward movement of the cap 120d. In the embodiment shown in FIG. 9B, this outward movement of the cap 120d displaces the cap 120d into a position in which the perforations 124d are unsealed/exposed. As such, the inflation gas created by the combustion of the second inflation source 60 may exit the second chamber 112 by passing through the perforations 124d. At the same time however, this displacement of the cap 120d does not operate to unseat the cap 120d from the cup 120 due to constraints in place that are designed for this purpose. Rather, when the cap 120d is displaced, the cap 120d will abut with the upper wall 72 of the inflator 34d and will be maintained in a position that will allow the combustion of the second inflation source 60 to occur at a high/optimal pressure.

As explained above, the above-described embodiments are designed such that the actuation of the second stage will displace the cap as a means of exposing/unsealing the perforations. It should be noted, however, that other embodiments may be designed such that actuation of the second initiator causes the generant cup to displace (and expose the perforations) rather than the cap. For example, embodiments may be constructed in which the actuation of the second initiator operates to expose the perforations by causing the cup to displace and/or slide off its base. In other embodiments, a portion of the cup and/or the cap may displace to expose the perforations. In yet further embodiments, both the cap and the cup may displace to expose the perforations. Those with skill in the art will recognize that any type of movement that operates to expose the perforations in the cup 110a may be used in these embodiments.

The present embodiments also provide a method of making an airbag system 30. This method involves the step of obtaining an airbag 32 and obtaining an inflator.

The inflator used in the present method may either be any of the inflators described herein. Further, the method also involves the step of obtaining a sensor 36 that measures the severity of the vehicular impact.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator for inflating an airbag comprising:
a housing;
a first chamber disposed within the housing;
a generant cup and a cap disposed within the housing, the generant cup and the cap defining a second chamber that houses gas generant, the cap engaging the generant cup in seated engagement; and
one or more perforations, wherein actuation of gas generant in the second chamber unseals the one or more perforations, wherein the movement of the cap does not separate the cap from the generant cup, wherein the first chamber is capable of being actuated independent of the second chamber.

2. An inflator as in claim 1 wherein during actuation of the gas generant in the second chamber, the cap is restrained from unseating from the generant cup by having the cap abut against an upper wall of the housing.

3. An inflator as in claim 1 wherein the perforations are located on the cap and wherein the inflator is constructed such that actuation of the gas generant in the second chamber unseals the perforations by displacing the cap.

4. An inflator as in claim 1 wherein the perforations are located on the generant cup.

5. An inflator as in claim 1 wherein actuation of the gas generant comprises combustion of the gas generant.

6. An inflator as in claim 1 wherein the pressure of the second chamber during actuation of the gas generant is maintained at a pressure that is greater than atmospheric pressure.

7. An inflator as in claim 1, wherein the first chamber comprises a inflation source, wherein actuation of the first initiator comprises ignition of the inflation source.

8. An inflator as in claim 1, wherein the inflator communicates with a sensor that determines the severity of an impact, wherein if the sensor detects that the severity of the impact is above a first threshold, the inflator actuates gas generant stored in the first chamber.

9. An inflator as in claim 8, wherein if the sensor detects that the severity of the impact is above a second threshold level greater than the first threshold level, the inflator actuates gas generant in both the first chamber and the second chamber.

10. An inflator as in claim 9, wherein if the sensor detects that the severity of the impact is above a second threshold level, the first chamber will be actuated prior to the actuation of the second chamber.

11. An airbag system comprising:
   an airbag;
   an inflator comprising:
      a housing;
      a first chamber disposed within the housing;
      a generant cup and a cap disposed within the housing, the generant cup and the cap defining a second chamber that houses gas generant, the cap engaging the generant cup in seated engagement;
      one or more perforations, wherein actuation of gas generant in the second chamber unseals the one or more perforations, wherein the movement of the cap does not separate the cap from the generant cup; and
   a sensor that detects the severity of an impact such that if the sensor detects that the severity of the impact is above a first threshold, the inflator actuates gas generant in the first chamber, wherein the first chamber is capable of being actuated independent of the second chamber chamber.

12. An airbag system as in claim 11, wherein if the sensor detects that the severity of the impact is above a second threshold level greater than the first threshold level, the inflator actuates gas generant in both the first chamber and the second chamber.

13. An airbag system as in claim 11 wherein the one or more perforations are located on the cap and actuation of the gas generant in the second chamber unseals the perforations by moving the cap.

14. An airbag system as in claim 11 wherein the perforations are located on the generant cup.

15. An airbag system as in claim 11, wherein the pressure of the second chamber during actuation of the gas generant is maintained at a pressure that is greater than atmospheric pressure.

16. A method for making an airbag system, the method comprising:
   obtaining an airbag;
   obtaining an inflator, the inflator comprising:
      a housing;
      a first chamber disposed within the housing;
      a generant cup and a cap disposed within the housing, the generant cup and the cap defining a second chamber that houses gas generant, the cap engaging the generant cup in seated engagement; and
      one or more perforations, wherein actuation of gas generant in the second chamber unseals the one or more perforations, wherein the movement of the cap does not separate the cap from the generant cup; and
   obtaining a sensor that detects the severity of an impact such that if the sensor detects that the severity of the impact is above a first threshold, the inflator actuates gas generant in the first chamber, wherein the first chamber is capable of being actuated independent of the second chamber.

17. A method as in claim 16 wherein if the sensor detects that the severity of the impact is above a second threshold level greater than the first threshold level, the inflator actuates gas generant in both the first chamber and the second chamber.

18. A method as in claim 16 wherein the inflator actuates gas generant in the first chamber before actuating the gas generant in the second chamber.

19. A method as in claim 16 wherein the second chamber during actuation of the gas generant is maintained at a pressure that is greater than atmospheric pressure.

20. A method as in claim 16 wherein during actuation, the cap moves to expose and unseal the perforations.

* * * * *

UNITED STATES PATENT AND TRADEMARK OFFICE
CERTIFICATE OF CORRECTION

PATENT NO.        : 7,374,204 B2                                    Page 1 of 1
APPLICATION NO. : 11/287843
DATED             : May 20, 2008
INVENTOR(S)       : Isaac L. Hoffman et al.

It is certified that error appears in the above-identified patent and that said Letters Patent is hereby corrected as shown below:

On the Title page of patent, please replace Field 75 Inventors "Kirk Rassmussen" with --Kirk Rasmussen--.

In column 4, line 65, please replace "a "steering wheel"airbag system in that the airbag" with --a "steering wheel" airbag system in that the airbag--

In column 13, line 28, please replace "chamber chamber" with --chamber--

Signed and Sealed this

Twenty-ninth Day of July, 2008

JON W. DUDAS
*Director of the United States Patent and Trademark Office*